US012811871B2

(12) United States Patent
Jakhar

(10) Patent No.: US 12,811,871 B2
(45) Date of Patent: Nov. 24, 2026

(54) SYSTEMS AND METHODS FOR REMOTE ASSESSMENT OF DEVICES

(71) Applicant: Aseem Jakhar, Uttar Pradesh (IN)

(72) Inventor: Aseem Jakhar, Uttar Pradesh (IN)

( * ) Notice: Subject to any disclaimer, the term of this patent is extended or adjusted under 35 U.S.C. 154(b) by 0 days.

(21) Appl. No.: 19/370,432

(22) Filed: Oct. 27, 2025

(65) Prior Publication Data

US 2026/0214042 A1 Jul. 23, 2026

Related U.S. Application Data

(63) Continuation of application No. PCT/IB2023/059216, filed on Sep. 18, 2023.

(51) Int. Cl.
*G06F 15/173* (2006.01)
*H04L 43/50* (2022.01)

(52) U.S. Cl.
CPC .................................... *H04L 43/50* (2013.01)

(58) Field of Classification Search
CPC ...... H04L 43/50; H04L 43/14; G06F 11/3688; G06F 11/3696; G06F 11/3698
USPC ................................ 709/224, 223, 203, 217
See application file for complete search history.

(56) References Cited

U.S. PATENT DOCUMENTS 6,859,922 B1 * 2/2005 Baker ................. G06F 11/3414 717/124
7,523,198 B2 * 4/2009 Wu ....................... H04L 67/125 709/224
8,856,748 B1 * 10/2014 Larsen ................ G06F 11/3668 717/125
9,009,666 B1 * 4/2015 Martindale ........... G06F 11/368 717/122
12,254,496 B1 * 3/2025 Norris ...................... G06F 3/167
2003/0028803 A1 * 2/2003 Bunker, V .............. H04L 43/00 709/224
2006/0094400 A1 * 5/2006 Beachem ................ H04W 4/02 455/410
2008/0301647 A1 * 12/2008 Neystadt ............. G06F 11/3672 717/127
2015/0024720 A1 1/2015 Efrati
2016/0034690 A1 * 2/2016 Kejriwal ............... G06F 21/577 726/25
2020/0322826 A1 * 10/2020 Wangler .................. H04L 43/50
2020/0379895 A1 * 12/2020 Khandelwal ........ G06F 11/3688

(Continued)

OTHER PUBLICATIONS

International Search Report & Written Opinion for PCT Application No. PCT/IB2023/059216; mailed Oct. 31, 2024; 11 pages.

*Primary Examiner* — Kaylee J Huang
(74) *Attorney, Agent, or Firm* — Blueshift IP; Robert Plotkin

(57) ABSTRACT

The present disclosure relates to a proximity system (100) and a method (900) to perform and schedule remote assessment of target devices (102) remotely over a communication network (104). The proximity system (100) includes an assessment device that remains in physical or logical proximity of the target device (102) and takes commands remotely from the test experts, via a client application (CA) (106A), over the communication network (104), executes them through communication data on the target device (102), and sends the results back to the client application (CA) (106A) for the experts to analyse.

14 Claims, 10 Drawing Sheets

(56) References Cited

U.S. PATENT DOCUMENTS

| | | | | |
|---|---|---|---|---|
| 2022/0050769 | A1* | 2/2022 | Huang | G06F 11/3457 |
| 2022/0417129 | A1* | 12/2022 | Manuel | H04L 43/14 |

* cited by examiner

SYSTEMS AND METHODS FOR REMOTE ASSESSMENT OF DEVICES

FIELD OF INVENTION

The present disclosure generally relates to the field of remote assessment mechanisms. More particularly, the present disclosure relates to a system and a method for remote assessment of devices.

DEFINITIONS

As used in the present disclosure, the following terms are generally intended to have the meaning as set forth below, except to the extent that the context in which they are used to indicate otherwise.

Proximity system: The term 'proximity system' hereinafter refers to an assessment device that remains in physical or logical proximity of a target device and takes commands remotely from the test experts, via the Client, over a network (or Internet), executes them on the target device and sends the results back for the experts to analyze.

Proximity: The term 'proximity' hereinafter refers to a communication range or connection between the proximity system and the target device. The proximity is defined by a proximity mode and a device interface used by the proximity system. In an example, there are two types of proximity modes consist of a non-physical proximity mode and physical proximity mode (i.e., wireless proximity mode and wired proximity mode respectively).

Provisioning: The term "provisioning" hereinafter refers to the process of setting up the proximity system, and includes the steps required to configure and manage user and system access to various resources like AED etc. Non-physical proximity mode: The term 'non-physical proximity mode' hereinafter refers to a communication range or a connection that is established using wireless communication methods or protocols including Bluetooth protocol standards, IEEE 802 wireless standards, ETSI wireless standards, NFC standards, RFID standards, microwave, infrared, electromagnetic interference, acoustic, laser, mobile communication protocol standards, raw radio or RF transfer, and so forth.

Physical proximity mode: The term 'physical proximity mode' hereinafter refers to a communication range or a connection that is established using wired communication methods or protocols including jumper wires, probes, connectors, RS 232, Joint Test Action Group (JTAG), Serial Wire Debug (SWD), Inter-Integrated Circuit, (I2C), Serial Peripheral Interface bus (SPI), Universal Asynchronous Reception and Transmission (UART), Universal Serial Bus (USB), Controller Area Network (CAN) bus, High-Definition Multimedia Interface (HDMI), hardware communication ports, and so forth.

Automated Discovery and Communication (ADC): The term 'Automated Discovery and Communication (ADC)' hereinafter refers to a mechanism for communication between two devices that do not require direct human intervention specifically for device provisioning, initiating discovery, or communication. This could be over hardware, radio, TCP/IP based or similar network, or any other medium.

Target device: The term 'target device' hereinafter refers to a device or a set of devices that have to be assessed using the proximity system.

Expert: The term 'expert' hereinafter refers to an assessment expert who will use the proximity system to assess the target device.

Provider: The term 'provider' hereinafter refers to a service provider of a proximity system platform.

Helper (H): The term 'helper' hereinafter refers to an engineer who helps to configure the proximity system with the target device for running tests on the target device.

Customer: The term 'customer' hereinafter refers to an owner of the target device or an entity that is requesting the assessment of the target device(s) associated with him or her.

User: The term 'user (U)' hereinafter refers to a user of the proximity system who can be the expert performing the assessment or a helper configuring the proximity system for running the tests.

Client application (CA) (CA): The term 'client application (CA)' hereinafter refers to an online application that is used to access the proximity system. The client application (CA) can be a web application being accessed by the user on his personal computer or a mobile application being accessed by the user on his mobile device.

Management Engine (ME): The term 'management engine' hereinafter refers to a management platform of the proximity system for implementing the proximity system.

Assessment Engine (AE): The term 'assessment engine (AE)' hereinafter refers to an engine that performs the assessment of the target device by executing the test cases on the target device. In some cases, the test cases can include business logic as well. The business logic is a logic of an application. In testing, the business logic typically refers to test cases that test the business logic of the target device. The user interacts indirectly with the assessment engine (AE) via a client application (CA), whereas the client application (CA) is part of the Management engine. The user communicates with the client application (CA) (management engine) for running the tests. The user may access the assessment engine (AE) only when provisioning it for the proximity system.

Interface Module (IM): The term 'interface module (IM)' hereinafter refers to a hardware module that interfaces with the target device over a specific interface or protocol and may contain the test cases to perform analysis for that specific interface and protocol of the target device. The interface module can be for hardware, radio, network, or any other interface that allows interaction with the target device. The proximity system may contain more than one interface module depending on the requirement of the customer or the target device.

AEIM: The term 'AEIM' hereinafter refers to an assessment device that is a combination of the assessment engine (AE) and the interface module.

AEME: The term 'AEME' hereinafter refers to an assessment device that is a combination of the assessment engine (AE) and the management engine.

AE Device (AED): The term 'AE Device (AED)' hereinafter refers to an assessment device that is running the assessment engine (AE). It could be an AE, AEIM, or AEME device.

Management Proxy (MP): The term 'management proxy (MP)' hereinafter refers to a cloud based proxy for enabling remote access and usage of the proximity system in cases where the management engine is not accessible to the user over a network or the Internet. The capabilities will depend on the requirements of the customer from only proxying to storage and analytics. If it is taking on more capabilities of the management engine, then it will converge into a "split proximity system".

Communication Network: The term 'communication network' hereinafter refers to a network over which the proximity system operates. In an example, the communication network can be 3G, 4G, 5G, 6G, IEEE 802.11, or any suitable wireless communication network.

Internet: The term 'Internet' hereinafter refers to a global system of interconnected computer networks that uses the Internet protocol suite (TCP/IP) to communicate between networks and devices.

Internal Network: The term 'internal network' hereinafter refers to an internal network of an organization.

Single PS (S-PS): The term 'Single PS (S-PS)' hereinafter refers to a single proximity system architecture where the management engine, the assessment engine (AE), and the interface module are combined as one physical device.

Split-3PS (S3-PS): The term 'Split-3PS (S3-PS)' hereinafter refers to a split architecture of the proximity system where the management engine, the assessment engine (AE), and the interface module are segregated into three separate devices.

Split2A-PS (S2A-PS): The term 'Split2A-PS (S2A-PS)' hereinafter refers to a split architecture of the proximity system consisting of two components where the assessment engine (AE) and the interface module are combined into one device (AEIM) and the management engine is segregated as another device.

Split2B-PS (S2B-PS): The term 'Split2B-PS (S2B-PS)' hereinafter refers to a split architecture of the proximity system consisting of two components where the management engine and the assessment engine (AE) are combined into one device (AEME) and the interface module is segregated as another device.

API: The term 'API' hereinafter refers to an application programming interface used to communicate with the proximity system.

Printed Circuit Board (PCB): The term 'Printed Circuit Board (PCB)' hereinafter refers to a board that is a medium used to connect electronic components to one another in a controlled and defined manner.

Graphical User Interface (GUI): The term 'Graphical User Interface (GUI)' hereinafter refers to an interface that allows the users to interact with electronic devices via graphical icons, menus, audio, etc. instead of a text-based user interface like Command-line interfaces, etc.

BACKGROUND

The background information herein below relates to the present disclosure but is not necessarily prior art.

Standalone hardware tools are traditionally used for testing devices. These tools typically connect to a PC via a USB or some other cable or wireless mechanism and a client software running on the PC interacts with the tool and sends commands to run certain tests. The results of the tests are gathered by the client software and displayed to the user or stored in a local file on the PC. This client software can be as simple as a hyper terminal that communicates over serial with the tool or custom GUI software built specifically for the tool or if the tool has network interfaces then typically it would run a web service locally which can be accessed over the local network via a client software.

The limitation of the standalone assessment device includes:

- The user of the assessment device needs physical access to both the assessment device and the target device, every time the test cases are to be executed on the target device.
- The user of the assessment device cannot manage and operate the assessment device remotely.
- The results of the execution of the test cases are not readily available with the remote users.
- Different assessment devices are required to perform different tests and most will have a different user interface and output format which makes it extremely difficult to consolidate and formalize the test results.
- A single assessment device can perform a limited type and number of test cases.
- The assessment device has the limitation of scheduling of tests for a later time, and therefore manual efforts are required each time the test cases are executed on the target devices.

OBJECTS

Some of the objects of the present disclosure, which at least one embodiment herein satisfies, are as follows:

An object of the present disclosure is to provide a system for the remote assessment of target devices.

Another object of the present disclosure is to provide a management engine that is responsible for the management, user interface, analytics, storage, and scalability.

Yet another object of the present disclosure is to provide an assessment engine (AE) that is responsible for actual assessments, managing and executing the required test suites or test cases.

Still another object of the present disclosure is to provide an interface module that provides an interface and may implement test cases specific to an interface/protocol.

Another object of the present disclosure is to provide a management proxy that enables the communication between the client application (CA) on a user device and the management engine, in some cases.

Yet another object of the present disclosure is to provide a proximity system that comprises more than one interface module to assess different interfaces as each interface module will focus on one or a set of protocols.

Still another object of the present disclosure is to provide a proximity system that consists of a single device implementing all three main components (the management engine, the assessment engine (AE), and the interface module).

Another object of the present disclosure is to provide a proximity system that consists of multiple devices implementing the three components (the management engine, the assessment engine (AE), and the interface module) in physically separate devices.

Yet another object of the present disclosure is to provide a method for the remote assessment of devices.

Other objects and advantages of the present disclosure will be more apparent from the following description, which is not intended to limit the scope of the present disclosure.

BRIEF DESCRIPTION OF THE ACCOMPANYING DRAWING

The illustrated embodiments of the subject matter will be best understood by reference to the drawings, wherein like parts are designated by like numerals throughout. The following description is intended only by way of example and simply illustrates certain selected embodiments of devices, systems, and processes that are consistent with the subject matter as claimed herein, wherein:

Figure 1:
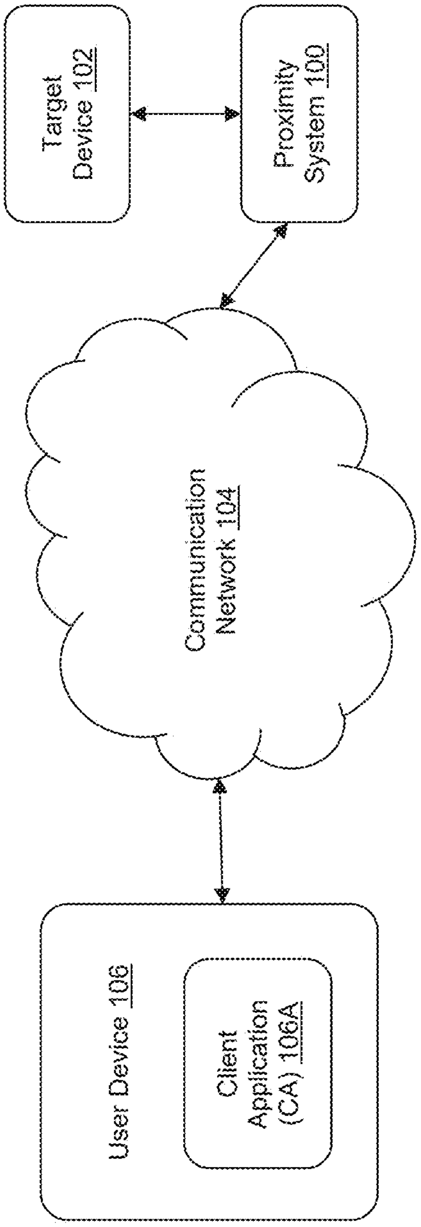
FIG. 1 illustrates high-level network architecture of a proximity system for remote assessment of a target device, in accordance with an embodiment of the present disclosure.

| LIST OF REFERENCE NUMERALS | |
|---|---|
| 100 - | Proximity System |
| 102 - | Target Device |
| 104 - | Communication Network |
| 106 - | User Device |
| 106A - | Client Application (CA) |
| 202 - | Data Repository |
| 204 - | Processor |
| 206 - | Management Engine |
| 208 - | Assessment Engine (AE) |
| 210 - | Interface Module(s) |
| 304 - | Automated Discovery and Communication (ADC) |
| 402 - | Management Proxy (MP) |
| 900 - | Method |

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open-ended transitional phrases and therefore specify the presence of stated features, integers, steps, operations, elements, and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

When an element is referred to as being "engaged to," "connected to," or "coupled to" another element, it may be directly engaged, connected or coupled to the other element. As used herein, the term "and/or" includes any and all combinations of one or more of the associated listed elements.

In an existing system needs physical access to run and execute the tests. The remote assessment is not possible because the user cannot manage and operate the hardware tool remotely, further it is extremely difficult to consolidate and formalize the test results. Some existing system works on the software based assessment that does not access hardware components and may or may not have remote software assessment capabilities.

To overcome the above-mentioned problems, the present disclosure proposes a system (hereinafter referred to as "system 100") and a method (hereinafter referred to as "method 900") for remote assessment of a target device. The system 100 and method 900 are now being described with reference to FIG. 1 to FIG. 9.

Exemplary Environment

FIG. 1 illustrates an exemplary architecture to implement a proximity system 100 for remote assessment of a target device 102, in accordance with an exemplary embodiment of the present disclosure. In an aspect, the architecture of the present disclosure includes the system 100 to perform and schedule remote assessment of a target device 102 remotely over a communication network 104 that conventionally requires an expert in physical proximity to the target device 102 to run tests on the target device 102. In an example, the communication network 104 can be 3G, 4G, 5G, 6G, or any suitable wireless communication network.

In an aspect, the proximity system 100 includes an assessment device that remains in physical or logical proximity of the target device 102 and takes commands remotely from the test experts, via a client application (CA) 106A installed on a user device 106, over the communication network 104 (or Internet), executes them on the target device 102, and sends the results back to the client application (CA) 106A for the experts to analyse.

In an aspect, the client application (CA) 106A is one of a web application, a mobile application, a thin or a thick client application (CA), or an interface application.

In an aspect, the proximity system 100 is positioned in physical and logical proximity of the target device 102, where the proximity between the proximity system 100 and the target device 102 depends on device interface of the target device 102 and type of assessments to be performed on the target device 102.

Exemplary Embodiments/Implementations

Figure 2:
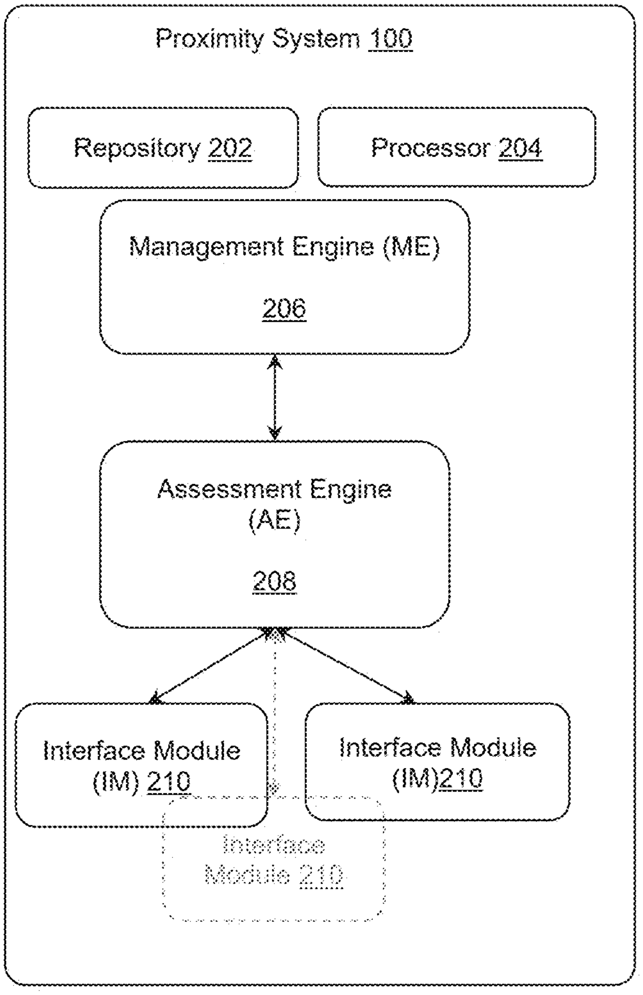
FIG. 2 illustrates a block diagram of the proximity system for remote assessment of the target device, in accordance with an embodiment of the present disclosure.

FIG. 2 illustrates a block diagram of the proximity system 100 for remote assessment of the target device 102, in accordance with an embodiment of the present disclosure. In an aspect, the proximity system 100 includes a data repository 202 having embodied thereon one or more computer executable instructions and a set of predefined test codes to perform remote assessment of the target device 102. The data repository 202 may store one or more computer-readable instructions or routines, which may be fetched and executed to perform remote assessment of the target device

102. The data repository 202 may include any non-transitory storage device including, for example, volatile memory such as RAM, or non-volatile memory such as EPROM, flash memory, and the like.

The proximity system 100 may also include a processor 204. The processor 204 may be implemented as one or more microprocessors, microcomputers, microcontrollers, digital signal processors, central processing units, logic circuitries, and/or any devices that manipulate data based on operational instructions. Among other capabilities, the processor 204 is configured to fetch and execute the one or more pre-determined instructions stored in the data repository 202.

The processor 204 may be implemented as a combination of hardware and programming (for example, programmable instructions) to implement one or more functionalities of the processor 204. In the examples described herein, such combinations of hardware and programming may be implemented in several different ways. For example, the programming for the processor 204 may be processor-executable instructions stored on a non-transitory machine-readable storage medium and the hardware for the processor 204 may include a processing resource (for example, one or more processors), to execute such instructions. In the present examples, the machine-readable storage medium may store instructions that, when executed by the processing resource, execute the components of the proximity system 100. In such examples, the processor 204 may include the machine-readable storage medium storing the instructions and the processing resource to execute the instructions, or the machine-readable storage medium may be separate but accessible to the proximity system 100 and the processing resource. In other examples, the processor 204 may be implemented by electronic circuitry or a printed circuit board.

In an example, the processor 204 is coupled to the data repository 202 to execute the one or more computer executable instructions stored in the data repository 202.

The proximity system 100 further includes a management engine 206, an assessment engine (AE) 208, and an interface module(s) 210.

The management engine 206 is responsible for management, user interface, analytics, storage and scalability.

The assessment engine (AE) 208 is responsible for the actual assessments, managing and executing the required test suites or test cases.

The interface module(s) 210 provides an interface and may implement test cases specific to an interface/protocol implemented on the target device 102. The proximity system 100 may include more than one interface module 210 so as to assess different interfaces as each interface module will focus on one or a set of protocols.

The management engine 206, which when executed by the processor 204, implements a user interface between the client application (CA) 106A and the assessment engine (AE) 208. The interface module 210, which when executed by the processor 204, implements a device interface to establish a communication between the assessment engine (AE) 208 and the target device 102. The assessment engine (AE) 208, which when executed by the processor 204, receives assessment instructions from the client application (CA) 106A over the communication network 104, retrieves the set of predefined test codes from the data repository 202 based on the assessment instructions, executes the set of predefined test codes for generating a communication data, transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

In an aspect, the set of predefined test codes include a set of instructions to automatically test one or more applications executing on the target device, and the set of predefined test codes are executed for performing different types of assessments including a security testing, a regulation and compliance assessment, a functional testing, a fuzz testing, a regression testing, a safety testing, and a forensic analysis.

In an aspect, the management engine 206 receives the result of the execution of the test codes from the assessment engine (AE) 208 and performs an analysis of the result, and further configured to store in the data repository 202.

In an aspect, the assessment engine (AE) 208 exports the test output either to the client application (CA) 106A or to a third party system for analysis including an issue tracking, a project management, or a management software.

Further, the proximity system 100 may include a single assessment device implementing all the three main components (the management engine 206, the assessment engine (AE) 208, and the interface module(s) 210) or multiple assessment devices implementing the three components (the management engine 206, the assessment engine (AE) 208, and the interface module(s) 210) in physically separate assessment devices.

FIGS. 3 to 6 illustrate various exemplary embodiments of the proximity system 100 in accordance with an embodiment of the present disclosure.

First Exemplary Embodiment: Split-3 Proximity System

Figure 3:
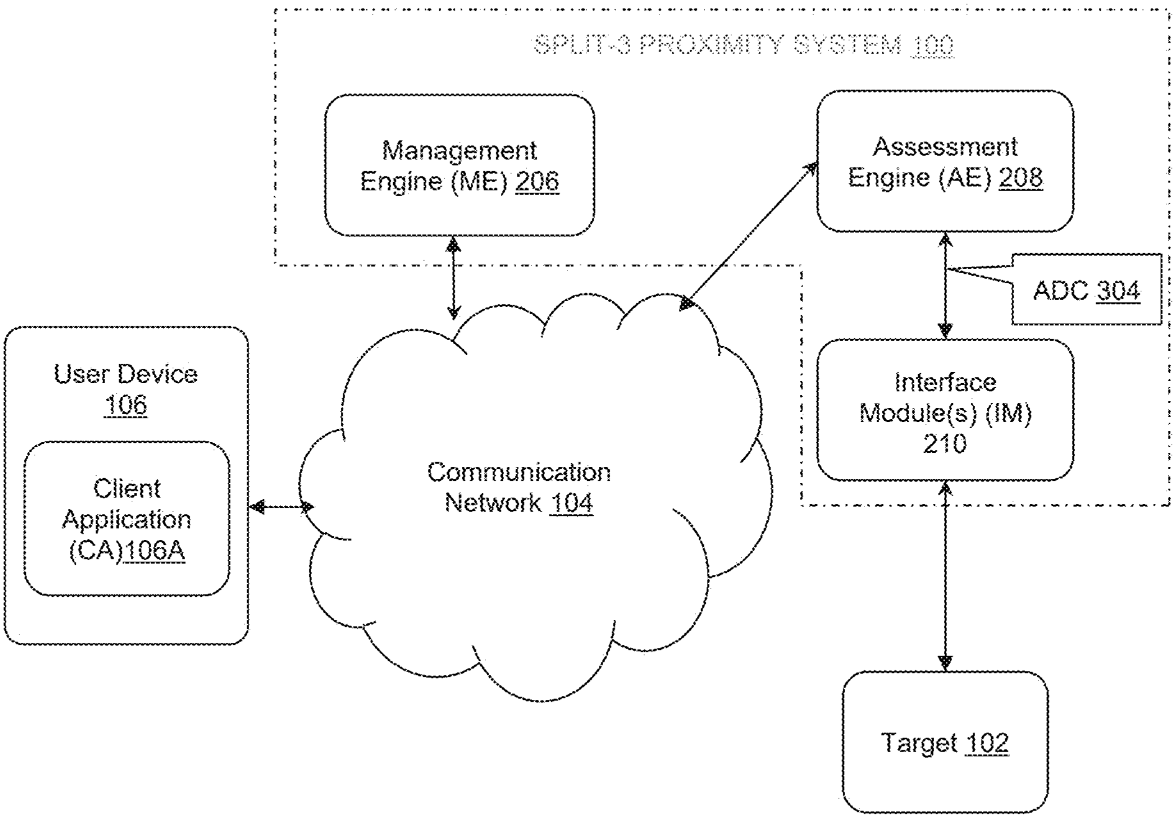
FIGS. 3 to 6 illustrate various exemplary embodiments of the proximity system 100 in accordance with an embodiment of the present disclosure

FIG. 3 illustrates a first exemplary embodiment of the proximity system 100 in accordance with the present disclosure. As per the first embodiment, the proximity system 100 is a split-3 proximity system in which the management engine 206, the assessment engine (AE) 208, and the interface module(s) 210 are segregated into three separate devices.

In the first embodiment, the assessment engine (AE) 208, which when executed by the processor 204, receives assessment instructions from the client application (CA) 106A installed on the user device 106 over the communication network 104, retrieves the set of predefined test codes from the data repository 202 based on the assessment instructions executes the set of predefined test codes for generating a communication data; transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

In an aspect, the set of predefined test codes include a set of instructions to automatically test one or more applications executing on the target device, and the set of predefined test codes are executed for performing different types of assessments including a security testing, a regulation or compliance assessment, a functional testing, a fuzz testing, a regression testing, a safety testing, and a forensic analysis.

In an aspect, the proximity system 100 is positioned in physical or logical proximity of the target device 102, where the proximity between the proximity system 100 and the target device 102 depends on device interface of the target device 102 and type of assessments to be performed on the target device 102.

In an aspect, the client application (CA) 106A is one of a web application, a mobile application, a thin or thick client application (CA), or an interface application.

In an aspect, the proximity system 100 further includes the management engine 206 that implements a user interface between the client application (CA) 106A and the assessment engine (AE) 208. Also, the management engine 206 is configured to receive the result of the execution of the test codes from the assessment engine (AE) 208 and performs an analysis of the result, and further configured to store the result in the data repository 202.

Figure 7:
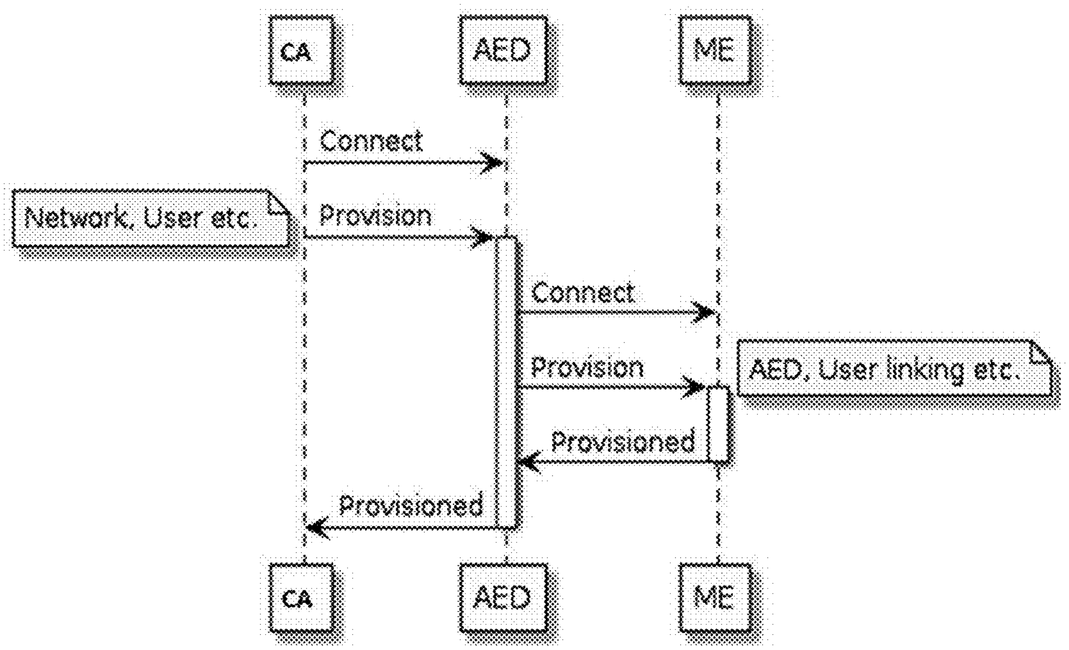
FIG. 7 illustrates a call flow diagram of a provisioning process of the proximity system, in accordance with an embodiment of the present disclosure.

In an aspect, as can be seen from FIG. 7, the proximity system 100 is provisioned for remote assessment of the target device 102 by establishing a network communication and linkage to allow the client application (CA) 106A installed on the user device 106 to access a user account created on the management engine 206, and based on the provisioning, the set of predefined test codes are retrieved from the data repository for remote assessment of the target device. For instance, FIG. 7 illustrates a call flow diagram of provisioning of the proximity system 100 with the management engine 206. The call flow of the proximity system provisioning includes the following steps:

- a user provisioning request is placed on the management engine 206 by a customer or a service provider as soon as the customer signs up with the remote assessment platform,
- a user related account is created and provisioned on the management engine 206, via management proxy 302, if the management engine 206 is not directly accessible to the user,
- Depending on the architecture of a target device 102 available with the user or customer, the assessment device 100 along with any interface module(s) 210 is shipped to the user or the customer based on where the target device 102 resides as it needs to be in proximity of the target device 102,
- Based on the authentication mechanism used during the provisioning, the user or customer may be required to access the management engine 206 to generate or use authentication related data required for the user provisioning of assessment device 100,
- The assessment device 100 is provisioned for network communication (if required) and linked to the user account on the management engine 206 by the user via the client application (CA) as shown in the diagram (FIG. 7),
- In case the proximity system 100 comes with in-built Internet connection like a SIM, then network provisioning during setup may not be required.
- Once the assessment device 100 or the proximity system 100 is provisioned, it is available for assessment via the management engine 206 for the user or the customer owning the target device 102.
- The connection between client application (CA) 106A and the proximity system 100 can be any communication mechanism that allows the user to access provisioning and general APIs on the proximity system 100, and
- The connection between assessment device 100 and the management engine 206 can be any communication mechanism that allows the assessment device 100 to access the management engine's APIs and vice-versa in cases where the management engine 206 is not part of the assessment device 100.

Further, in an aspect of the first embodiment, the proximity system 100 includes the interface module 210 that implements a device interface to establish a communication between the proximity system 100 and the target device 102 over a wireless communication medium in a non-physical proximity mode and over a physical communication medium in a physical proximity mode. In an example, in the non-physical proximity mode, the communication is established using wireless communication protocols including Bluetooth protocol standards, IEEE 802 wireless standards, ETSI wireless standards, NFC standards, RFID standards, microwave, infrared, electromagnetic interference, acoustic, laser, raw radio or RF transfer, and mobile communication protocol standards. In another example, in the physical proximity mode, the communication is established using wired communication protocols including jumper wires, probes, connectors, RS 232, Joint Test Action Group (JTAG), Serial Wire Debug (SWD), Inter-Integrated Circuit (I2C), Serial Peripheral Interface bus (SPI), Universal Asynchronous Reception and Transmission (UART), Universal Serial Bus (USB), Controller Area Network (CAN) bus, High-Definition Multimedia Interface (HDMI), and hardware communication ports.

In an aspect, the interface module(s) 210 is built-in with the assessment engine (AE) 208 or externally pluggable to the assessment engine (AE) 208 via an Automated Discovery and Communication (ADC) 304, or a combination of both.

In an aspect of the first embodiment, the proximity system exports the test output to a third party system for analysis including an issue tracking, a project management, or a management software.

Second Exemplary Embodiment: Split-2A Proximity System: AEIM 100A

Figure 4:
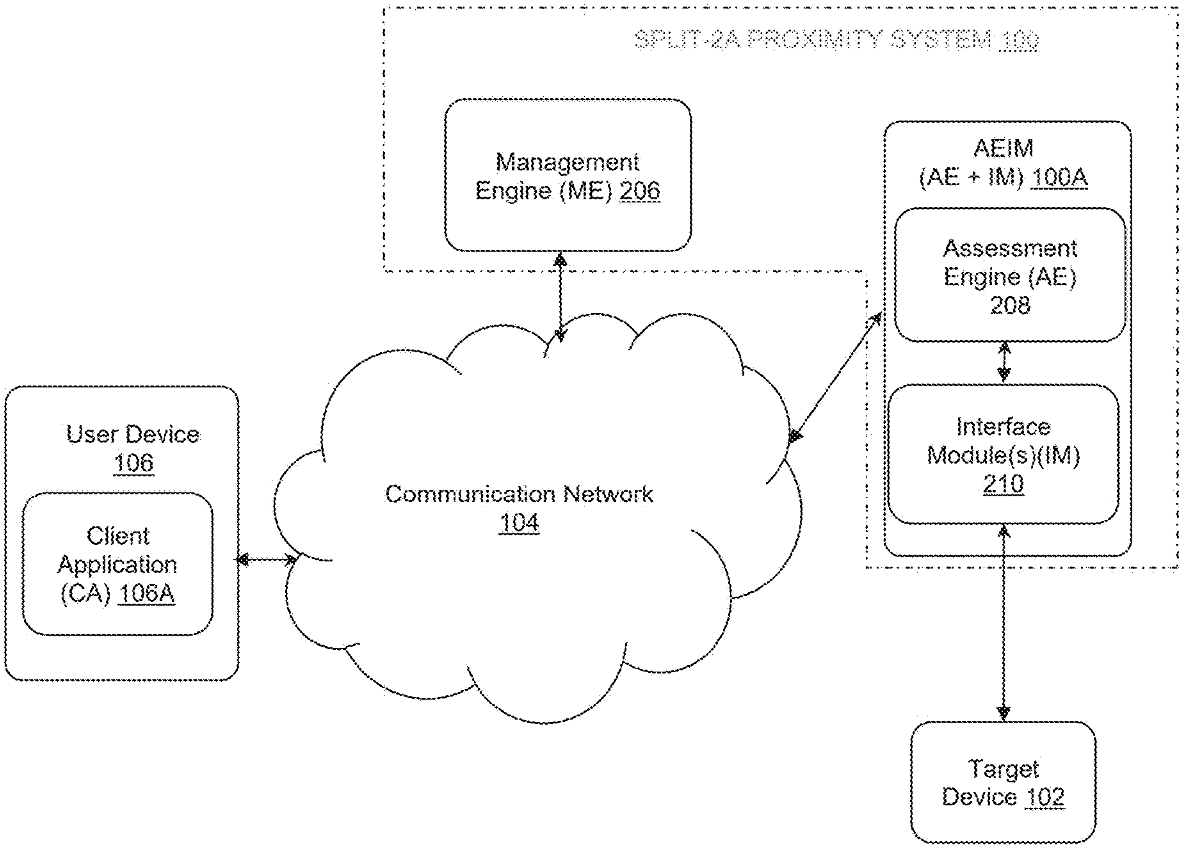

FIG. 4 illustrates a second exemplary embodiment of the proximity system 100 in accordance with the present disclosure. As per the second embodiment, the proximity system 100 is a split-2 proximity system in which the assessment engine (AE) 208 and the interface module(s) 210 are combined into a first assessment device (AEIM) 110A and the management engine 206 is segregated as second assessment device.

Third Exemplary Embodiment: Split-2B Proximity System: AEME 100B

Figure 5:
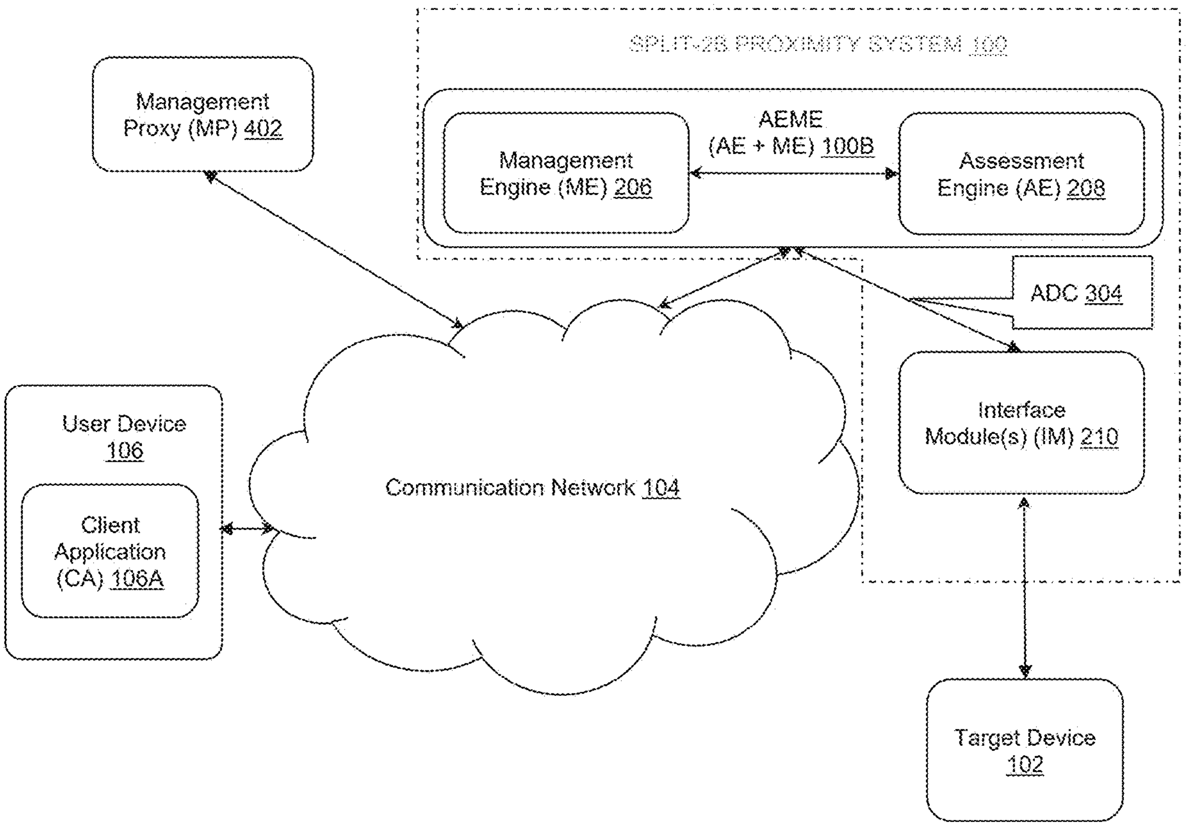

FIG. 5 illustrates a third exemplary embodiment of the proximity system 100 in accordance with the present disclosure. As per the third embodiment, the proximity system 100 is a split-2 proximity system in which the management engine 206 and the assessment engine (AE) 208 are combined into a first assessment device (AEME) 100B and the interface module(s) 210 is segregated as second assessment device.

In an aspect, the proximity system 100 comprises a management proxy 402 that is a cloud based proxy for enabling remote access and usage of the proximity system 100 when the management engine 206 is not accessible by the client application (CA) 106A over the communication network 104.

Fourth Exemplary Embodiment: Single Proximity System 100

Figure 6:
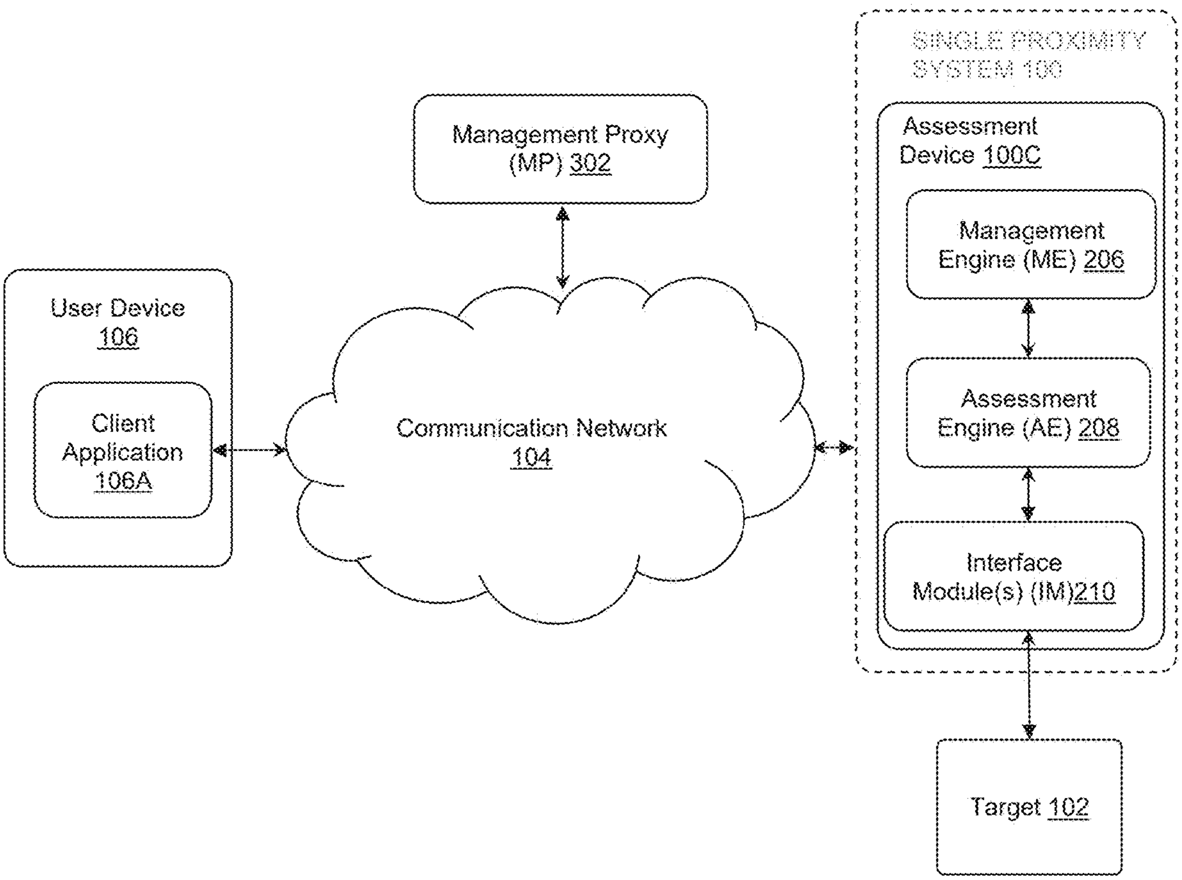

FIG. 6 illustrates a fourth exemplary embodiment of the proximity system 100 in accordance with the present disclosure. As per the fourth embodiment, the proximity system 100 is a single proximity system (single-PS system) in which the management engine 206, the assessment engine (AE) 208, and the interface module(s) 210 are combined in a single assessment device 100C.

In an aspect, the proximity system 100 comprises a management proxy 302 that is a cloud based proxy for enabling remote access and usage of the proximity system 100 when the management engine 206 is not accessible by the client application (CA) 106A over the communication network 104. In an operation, when a service provider is tasked with assessing a target device 102, the service provider has to travel to the customer premises or the customer has to ship the target device to the service provider's premises for performing an assessment of the target device's hardware, software, communication interfaces, and data. This puts a burden on the customer and the service provider in terms of both time and money. There is also a limitation on the number of experts, available with the service provider, who can travel for the assessment engagement to the client premises. Such requirement of the expert in the local proximity of the target device includes the following limitations:

- Experts' physical proximity to the target device is required to configure and run the tests.
- The experts have to travel to the target device location to be able to physically test the device.
- The experts have to perform manual actions to configure the target device and the tests, which typically can be performed by anyone who knows about the target device and the technology it is built on.
- If the travel is restricted due to any unforeseen reasons like a pandemic, other natural disasters or general travel restrictions, the unavailability of the expert for the duration of the restriction delays the assessment process.
- Recording the test data and sending it back to the experts is a manual and tedious process and adds a considerable amount of delay in the assessment process.
- Scheduling the tests is also a challenge as the test results are stored on the test computer connected to the target device which still requires manual effort to fetch the test results from the test computer for further action.

To address the above listed limitations, the proximity system 100 proposed herein takes away the hassles that require the experts' physical presence at the location of the target device 102. The proximity system 100 enables the remote assessment of the target device(s) 102. The proximity system 100 or its components are placed in physical (or logical) proximity of the target device 102 and then an engineer can configure the proximity system 100 and the target device 102 for running the tests. Once the devices are configured, an expert can access the proximity system 100 and perform the tests remotely over the communication network 104 (or Internet) using the proximity system 100 and running the tests or scheduling those tests to be run at a later time. The results of these tests are then recorded and stored automatically in the proximity system 100 for the expert to then analyse, run further tests if required, and/or report the findings to the other stakeholders.

In an aspect, the remote assessment of target device(s) 102 relies on the proximity system 100 that enables the experts to communicate and interface with the target device 102 to be assessed.

Further, the characteristics of the proximity system 100 and its components are listed below:

- The proximity system 100 includes the management engine 206 for providing the access to a user or an expert to perform remote assessment.
- The user provisioning of the proximity system 100 can be performed by allowing the user to logging into the management engine 206 and configuring the user account, over the Internet, or the communication network 104.
- The user provisioning of assessment device of the proximity system 100 for the user will be done by the user by accessing the local interface of assessment device to provision the assessment device for network access and linking it to the respective user account.
- The interface module(s) would not require provisioning as they will either be built-in with the assessment device or will communicate with the assessment device over Automated Discovery and Communication (ADC) 304.
- Each user will have the assessment device(s) linked to their account. The type of the assessment device will be based on the architecture deployed for the customer.
- It is always possible to add new interface module(s) to the proximity system 100 regardless of the architecture of the proximity system 100, for example, by connecting the new external interface module(s) to the assessment engine (AE), AEME, or AEIM or replacing the AEIM with a new AEIM containing the new inbuilt IMs altogether.
- In the proximity system architectures where the assessment engine (AE) and the interface module(s) are in separate physical systems, they use the Automated Discovery and Communication (ADC) 304 to couple with each other automatically. After coupling, the assessment engine (AE) will be able to initiate and execute tests using the interface module(s) on behalf of the user.
- The management proxy (MP) 402 will be utilized to mediate between the client application (CA) 106A and the management engine 206 in cases where the management engine 206 is not directly accessible to the client application (CA) 106A over the communication network 104 or Internet.

Yet further, the deployment of the proximity system 100 depends on the customer requirements and the architecture preferred. Following are the ways to deploy the system:

- Public Cloud—The management part of the proximity system 100 can be deployed on a public cloud for users to interact over the Internet,
- Private Cloud—The management part of the proximity system 100 can be deployed on a private cloud for the customers to interact with the system privately only for authorized users, and
- On-premise—The complete proximity system 100 can be deployed inside the customer's corporate infrastructure so only user within the communication network 104 can access it or authorized users who have access to the customer corporate infrastructure, using any security mechanism like virtual private network (VPN), etc.

Yet further, the proximity system 100:

- can be scaled to the requirements of the customer and the capabilities of the architecture in use. Further, the "Split proximity system" architecture allows for the management engine 206 to be deployed on the cloud and the scalability is based on the number and types of the assessment engine (AE) 208 and the interface module (s) 210 that are required, and
- will be accessible for remote assessment via the management engine 206 or the management proxy (MP) 402 in cases where the management engine 206 is not directly accessible to the user or customer.

Figure 8A:
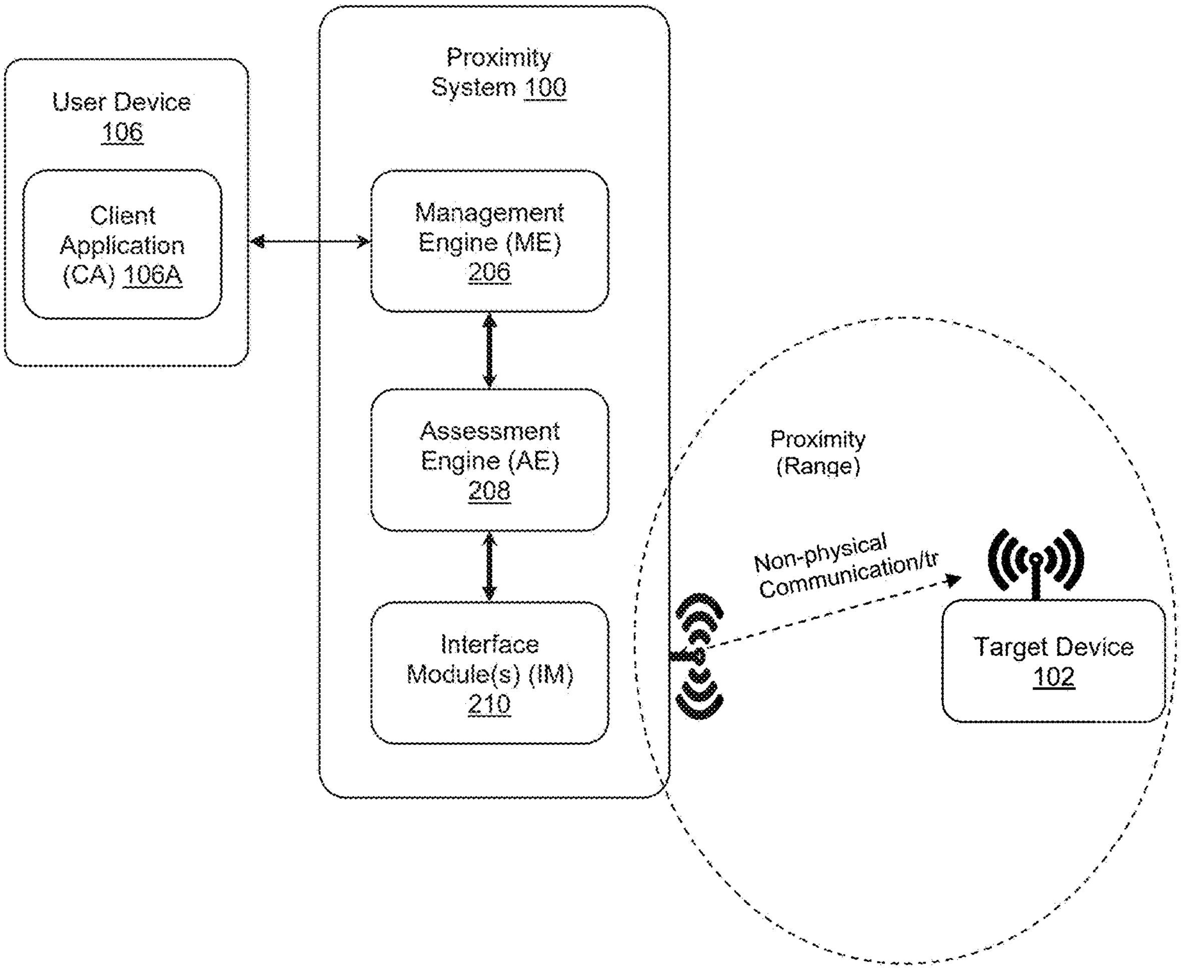
FIG. 8A illustrates an exemplary block diagram of a non-physical proximity mode connection of the proximity system with the target device, in accordance with a first implementation of the present disclosure.

Yet further, FIG. 8A illustrates a block diagram of the non-physical proximity mode in accordance with a first implementation of the present disclosure. The non-physical proximity mode includes any communication or transfer mechanism that does not involve direct physical connection or contact between the interface module(s) 210 and the target device 102. It covers all the communication or transfer methods that utilize any kind of radiation including electromagnetic such as radio, microwave, infrared etc. as well as mechanical such as acoustic etc. and any other similar methods. The communication may be over a defined protocol standard that utilizes a specific transfer mechanism or may be just raw transfer.

Figure 8B:
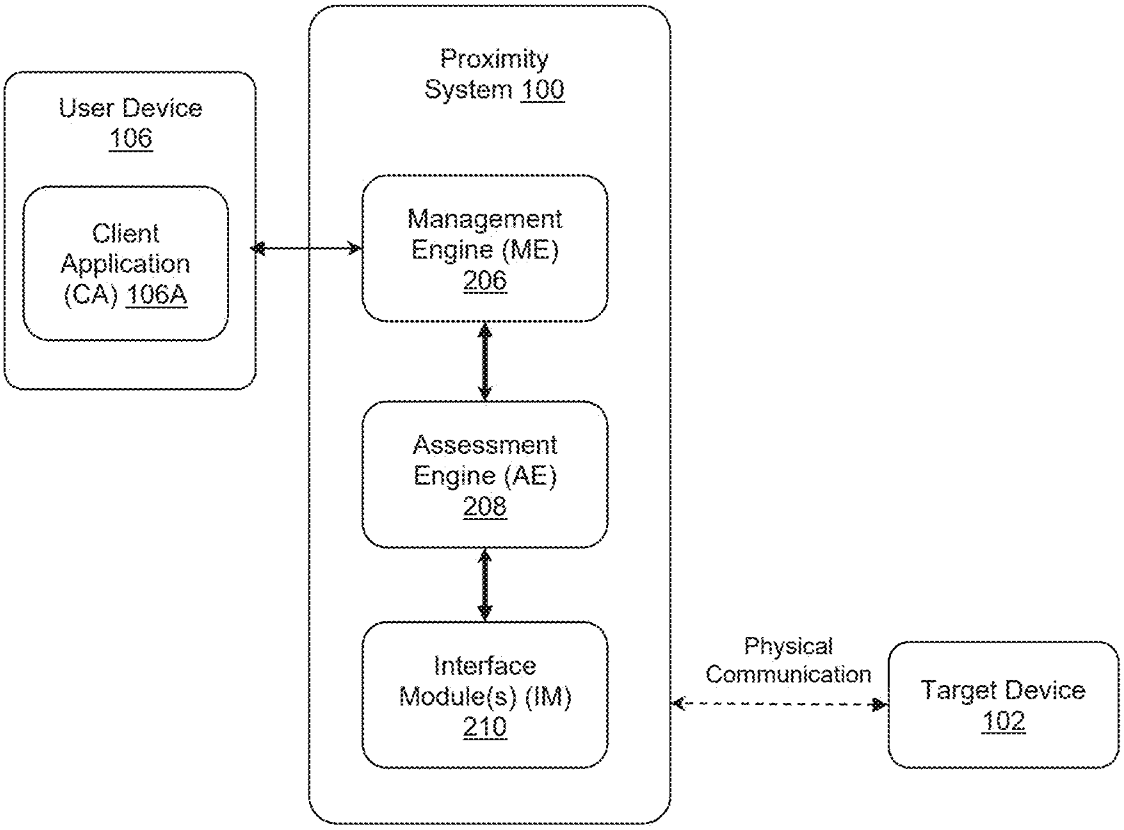
FIG. 8B illustrates an exemplary block diagram of a physical proximity mode connection of the proximity system with the target device, in accordance with a second implementation of the present disclosure.

Yet further, FIG. 8B illustrates an exemplary block diagram of a physical proximity mode connection, in accordance with a second implementation of the of the present disclosure. In the physical proximity mode, for the tests to be performed on the target device 102 that has the specific external interface(s) or its hardware as mentioned above, the interface module(s) 210 with similar interface, capabilities or probes must be connected to the target device' hardware using the relevant physical medium to enable it to effectively sniff, receive, transmit, emit, inject signals/data or communicate with the target device 102 or directly it's hardware. This communication may be over a defined protocol or raw signals. The proximity in this mode is defined by the physical medium used for physically connecting both interface module and the target device hardware.

In an aspect, once the setup is complete and the proximity system 100 is ready for assessment, the user who has physical access to the interface module 210 will place it in the proximity, as defined by the proximity mode used, i.e., the non-physical proximity mode or physical proximity mode, to the target device 102 for starting the assessment.

- Once provisioned, the assessment engine (AE) 208 usually will have persistent connection with the management engine 206.
- The user connects to the management engine 206 using the client application (CA) 106A.
- The user initiates a test or set of tests on the management engine 206. The user may also schedule automated tests to be run at a later time or periodically.
- The management engine 206 communicates the information (tests, metadata) to the assessment engine (AE) 208.
- The assessment engine (AE) 208 then initiates the actual tests that are to be performed on the target device 102 using the appropriate interface module(s) 210.
- The interface module(s) 210 executes the test case logic and gathers the test results.
- The interface module(s) 210 pushes the results and any metadata back to the assessment engine (AE) 208 which intern sends it, after performing any required operations in the returned data, to Management Engine (ME) 206.
- The management engine 206 operates on the results and metadata, stores the data, if required, and shows the results back to the user.
- The management engine 206 performs analytics, runs an algorithm on the current and previous results gathered to determine whether everything is fine or there are issues from assessment perspective. This is dependent on the type of test being run and the pass/fail criteria for the test.
- The results can be exported out of the system and can also be pushed to other third-party systems like issue tracking, project management software, etc.
- Once all the tests have been run and analyzed, the proximity system 100 will generate an assessment report which can be shared with other stakeholders for taking decisions based on the findings in the report. The findings may also be pushed to other third-party systems like issue tracking, project management software, etc.

In an operative configuration, the data repository 202 having embodied thereon one or more computer executable instructions and a set of predefined test codes to perform remote assessment of the target device 102. The processor 204 coupled to the data repository 202 to execute the one or more computer executable instruction. The first assessment device having an assessment engine (AE), which when executed by the processor 204, receives assessment instructions from a client application (CA) installed on a user device over a communication network, retrieves the set of predefined test codes from the data repository 202 based on the assessment instructions, executes the set of predefined test codes for generating a communication data, transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

The data repository 202 having embodied thereon one or more computer executable instructions and a set of predefined test codes to perform remote assessment of the target device 102. The processor 204 coupled to the data repository 202 to execute the one or more computer executable instructions. The first assessment device having an interface module, which when executed by the processor 204, implements a device interface to establish a communication between the proximity system 100 and the target device 102 over a communication network, and an assessment engine (AE), which when executed by the processor 204, receives assessment instructions from a client application (CA) installed on a user device over the communication network, retrieves the set of predefined test codes from the data repository 202 based on the assessment instructions', executes the set of predefined test codes for generating a communication data; transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

The data repository 202 having embodied thereon one or more computer executable instructions and a set of predefined test codes to perform remote assessment of the target device 102. The processor 204 coupled to the data repository 202 to execute the one or more computer executable instructions. The first assessment device having a management engine, which when executed by the processor 204, implements a user interface between a client application (CA) and the first assessment device. The assessment engine (AE), which when executed by the processor 204, receives assessment instructions from the client application (CA) installed on a user device over a communication network, retrieves the set of predefined test codes from the data repository 202 based on the assessment instructions, executes the set of predefined test codes for generating a communication data, transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

The data repository 202 having embodied thereon one or more computer executable instructions and a set of predefined test codes to perform remote assessment of the target device 102. The processor 204 coupled to the data repository 202 to execute the one or more computer executable instructions. The assessment device having a management engine, which when executed by the processor 204, implements a user interface between a client application (CA) and the assessment device. The interface module, which when executed by the processor 204, implements a device interface to establish a communication between the proximity system 100 and the target device 102 over a communication network, and an assessment engine (AE), which when executed by the processor 204, receives assessment instructions from the client application (CA) over the communication network, retrieves the set of predefined test codes from the data repository 202 based on the assessment instructions executes the set of predefined test codes for generating a communication data, transmits the communication data to the target device 102 communicatively coupled to the proximity system 100 through a communication channel, receives a response from the target device 102 as a result of execution of features of the target device 102 based on the communication data, and interprets the response received from the target device 102 to assess whether the test failed or succeeded.

Figure 9:
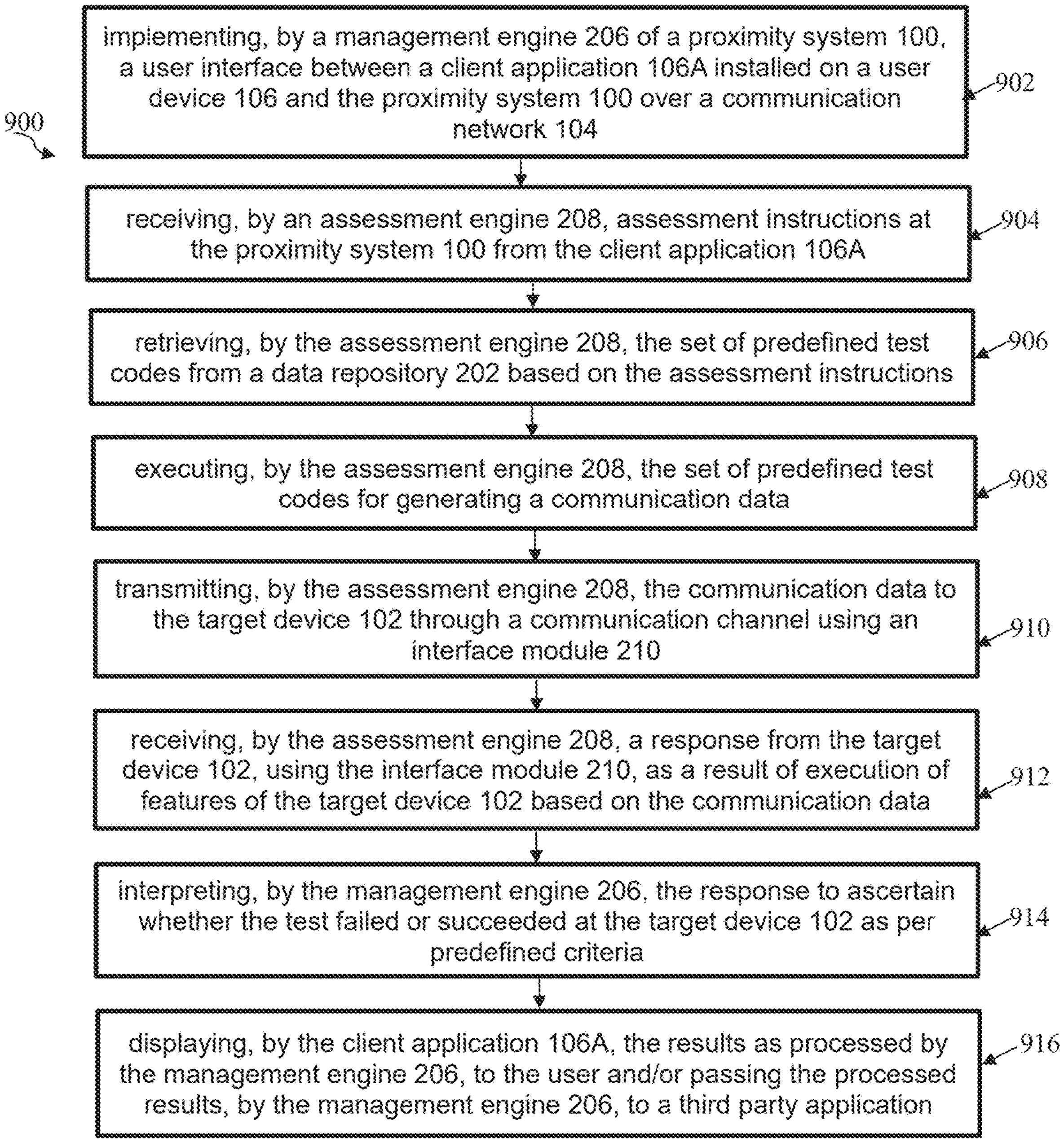
FIG. 9 illustrates an exemplary flowchart of a method for remote assessment of the target device, in accordance with an embodiment of the present disclosure.

FIG. 9 illustrate a method 900 for remote assessment of a target device 102 in accordance with an embodiment of the present disclosure. The order in which the method 900 is described is not intended to be construed as a limitation, and any number of the described method steps can be combined in any appropriate order to carry out the method 900 or an alternative method. Additionally, individual steps may be deleted from the method 900 without departing from the scope of the subject matter described herein. The method 900 includes the following steps of:

At step 902, the method 900 includes implementing, by a management engine 206 of a proximity system 100, a user interface between a client application (CA) 106A installed on a user device 106 and the proximity system 100 over a communication network 104.

At step 904, the method 900 includes receiving, by an assessment engine (AE) 208, assessment instructions at the proximity system 100 from the client application (CA) 106A.

At step 906, the method 900 includes retrieving, by the assessment engine (AE) 208, the set of predefined test codes from a data repository 202 based on the assessment instructions.

At step 908, the method 900 includes executing, by the assessment engine (AE) 208, the set of predefined test codes for generating a communication data.

At step 910, the method 900 includes transmitting, by the assessment engine (AE) 208, the communication data to the target device 102 through a communication channel using an interface module 210.

At step 912, the method 900 includes receiving, by the assessment engine (AE) 208, a response from the target device 102, using the interface module 210, as a result of execution of features of the target device 102 based on the communication data.

At step 914, the method 900 includes interpreting, by the management engine 206, the response to ascertain whether the test failed or succeeded at the target device 102 as per predefined criteria.

At step 916, the method 900 includes displaying, by the client application (CA) 106A, the results as processed by the management engine 206, to the user and/or passing the processed results, by the management engine 206, to a third party application. The foregoing description of the embodiments has been provided for purposes of illustration and is not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a system and a method for remote assessment of a target device that:

- provide remote assessment;
- provide collaboration;
- provide continuous/scheduled assessment and reusability;
- providing extensibility;
- providing high scalability;
- vulnerability management, and
- provide automation.

The embodiments herein and the various features and advantageous details thereof are explained concerning the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A proximity system for remote assessment of a target device, comprising:

a data repository-having embodied thereon one or more computer executable instructions and a set of predefined test codes to perform remote assessment of the target device;

wherein the set of predefined test codes include a set of instructions to automatically test one or more applications executing on the target device, and wherein the set of predefined test codes are executed for performing different types of assessments including a security testing, a regulation or compliance assessment, a functional testing, a fuzz testing, a regression testing, a safety testing, and a forensic analysis;

a processor coupled to the data repository to execute the one or more computer executable instructions;

a first assessment device having an assessment engine (AE), which when executed by the processor, receives assessment instructions from a client application (CA) installed on a user device over a communication network, retrieves the set of predefined test codes from the data repository-based on the assessment instructions, executes the set of predefined test codes for generating a communication data, the communication data comprising signals, protocol data, or both, for transmission to an external interface of the target device, over a defined protocol or as raw signals, transmits the communication data to the target device communicatively coupled to the proximity system-through a communication channel by way of an interface module, receives, by way of the interface module, a response from the target device produced by the target device responsive to the communication data transmitted to the external interface thereof, and interprets the response received from the target device to assess whether the execution of the set of predefined test codes failed or succeeded and generates a test output indicative of whether execution of the set of predefined test codes failed or succeeded;

a second assessment device communicatively coupled to the first assessment device, wherein the second assessment device includes a management engine that implements a user interface between the client application (CA) and the assessment engine (AE), and wherein the management engine receives the test output of the execution of the set of predefined test codes from the assessment engine (AE) and performs analysis of the test output and is further configured to store the test output in the data repository; and a third assessment device communicatively coupled to the first assessment device, wherein the third assessment device includes the interface module-comprising a hardware module that implements an interface to establish a communication between the proximity system and the external interface of the target device over a wireless communication medium in a non-physical proximity mode and over a physical communication medium in a physical proximity mode, the interface module executing test case logic of the set of predefined test codes that is specific to the external interface of the target device and gathering test results therefrom.

2. The proximity system as claimed in claim 1, wherein the proximity system is positioned in physical or non-physical proximity of the target device, and wherein the proximity between the proximity system and the target device depends on the external interface of the target device and type of assessments to be performed on the target device.

3. The proximity system as claimed in claim 1, wherein the client application (CA) is one of a web application, a mobile application, a thin or a thick client application (CA), or an interface application.

4. The proximity system as claimed in claim 1, wherein the proximity system is provisioned for remote assessment of the target device by establishing a network communication and linkage to allow the client application (CA) installed on the user device to access a user account created on the management engine, and based on the provisioning, the set of predefined test codes are retrieved from the data repository for remote assessment of the target device.

5. The proximity system as claimed in claim 1, wherein in the non-physical proximity mode, the communication is established using wireless communication protocols including Bluetooth protocol standards, IEEE 802 wireless standards, ETSI wireless standards, NFC standards, RFID standards, microwave, infrared, electromagnetic interference, acoustic, laser, raw radio or RF transfer, and mobile communication protocol standards, and wherein in the physical proximity mode, the communication is established using wired communication protocols including jumper wires, probes, connectors, RS 232, Joint Test Action Group (JTAG), Serial Wire Debug (SWD), Inter-Integrated Circuit (I2C), Serial Peripheral Interface bus (SPI), Universal Asynchronous Reception and Transmission (UART), Universal Serial Bus (USB), Controller Area Network (CAN) bus, High-Definition Multimedia Interface (HDMI), and hardware communication ports.

6. The proximity system as claimed in claim 5, wherein the interface module is built-in with the first assessment device or externally pluggable to the first assessment device via an Automated Discovery and Communication (ADC), or a combination of both.

7. The proximity system as claimed in claim 1, wherein the proximity system exports the test output to a third party system for analysis including an issue tracking, a project management, or a management software.

8. A proximity system for remote assessment of a target device, comprising:

a data repository having embodied thereon one or more computer executable instructions and a set of predefined test codes to perform remote assessment of the target device;

wherein the set of predefined test codes include a set of instructions to automatically test one or more applications executing on the target device, and wherein the set of predefined test codes are executed for performing different types of assessments including a security testing, a regulation or compliance assessment, a functional testing, a fuzz testing, a regression testing, a safety testing, and a forensic analysis;

a processor coupled to the data repository to execute the one or more computer executable instructions; and a first assessment device (AEIM) having:

an interface module, which when executed by the processor, implements an interface to establish a communication between the proximity system and the target device over a communication network, wherein the interface module comprises a hardware module that implements the interface to establish a communication between the proximity system and an external interface of the target device over a wireless communication medium in a non-physical proximity mode and over a physical communication medium in a physical proximity mode, the interface module executing test case logic of the set of predefined test codes that is specific to the external interface of the target device and gathering test results therefrom, and an assessment engine (AE), which when executed by the processor, receives assessment instructions from a client application (CA) installed on a user device over the communication network, retrieves the set of predefined test codes from the data repository based on the assessment instructions, executes the set of predefined test codes for generating a communication data, the communication data comprising signals, protocol data, or both, for transmission to the external interface of the target device, over a defined protocol or as raw signals, transmits the communication data to the target device communicatively coupled to the proximity system through a communication channel by way of an interface module, receives, by way of the interface module, a response from the target device produced by the target device responsive to the communication data transmitted to the device interface thereof, and interprets the response received from the target device to assess whether execution of the set of predefined test codes failed or succeeded and generates a test output indicative of whether execution of the set of predefined test codes failed or succeeded; and a second assessment device communicatively coupled to the first assessment device, wherein the second assessment device includes a management engine that implements a user interface between the client application (CA) and the assessment engine (AE), and wherein the management engine receives the test output of the execution of the set of predefined test codes from the assessment engine (AE) and performs analysis of the test output and is further configured to store the test output in the data repository.

9. The proximity system as claimed in claim 8, wherein the proximity system is positioned in physical or non-physical proximity of the target device, and wherein the proximity between the proximity system and the target device depends on the external interface of the target device and type of assessments to be performed on the target device.

10. The proximity system as claimed in claim 8, wherein the client application (CA) is one of a web application, a mobile application, a thin or a thick client application (CA), or an interface application.

11. The proximity system as claimed in claim 8, wherein the proximity system is provisioned for remote assessment of the target device by establishing a network communication and linkage to allow the client application (CA) installed on the user device to access a user account created on the management engine, and based on the provisioning, the set of predefined test codes are retrieved from the data repository for remote assessment of the target device.

12. The proximity system as claimed in claim 8, wherein in the non-physical proximity mode, the communication is established using wireless communication protocols including Bluetooth protocol standards, IEEE 802 wireless standards, ETSI wireless standards, NFC standards, RFID standards, microwave, infrared, electromagnetic interference, acoustic, laser, raw radio or RF transfer, and mobile communication protocol standards, and wherein in the physical proximity mode, the communication is established using wired communication protocols including jumper wires, probes, connectors, RS 232, Joint Test Action Group (JTAG), Serial Wire Debug (SWD), Inter-Integrated Circuit (I2C), Serial Peripheral Interface bus (SPI), Universal Asynchronous Reception and Transmission (UART), Universal Serial Bus (USB), Controller Area Network (CAN) bus, High-Definition Multimedia Interface (HDMI), and hardware communication ports.

13. A proximity system for remote assessment of a target device, comprising:

a data repository having embodied thereon one or more computer executable instructions and a set of predefined test codes to perform remote assessment of the target device;

wherein the set of predefined test codes include a set of instructions to automatically test one or more applications executing on the target device, and wherein the set of predefined test codes are executed for performing different types of assessments including a security testing, a regulation or compliance assessment, a functional testing, a fuzz testing, a regression testing, a safety testing, and a forensic analysis;

a processor coupled to the data repository to execute the one or more computer executable instructions; and a first assessment device (AEME) having:

a management engine, which when executed by the processor, implements a user interface between a client application (CA) installed on a user device and the first assessment device (AEME); and an assessment engine (AE), which when executed by the processor-, receives assessment instructions from the client application (CA) over a communication network, retrieves the set of predefined test codes from the data repository based on the assessment instructions, executes the set of predefined test codes for generating a communication data, the communication data comprising signals, protocol data, or both, for transmission to an external interface of the target device, over a defined protocol or as raw signals, transmits the communication data to the target device communicatively coupled to the proximity system through a communication channel by way of an interface module, receives, by way of the interface module, a response from the target device produced by the target device responsive to the communication data transmitted to the device interface, and interprets the response received from the target device to assess whether execution of the set of predefined test codes failed or succeeded and generates a test output indicative of whether execution of the set of predefined test codes failed or succeeded; and a management proxy (MP) that is a cloud based proxy for enabling remote access and usage of the proximity system when the management engine is not accessible by the client application (CA) over the communication network; and a second assessment device communicatively coupled to the first assessment device (AEME), wherein the second assessment device includes the interface module comprising a hardware module that implements an interface to establish a communication between the proximity system and the external interface of the target device over a wireless communication medium in a non-physical proximity mode and over a physical communication medium in a physical proximity mode, the interface module executing test case logic of the set of predefined test codes that is specific to the external interface of the target device and gathering test results therefrom.

14. A proximity system for remote assessment of a target device, comprising:

a data repository having embodied thereon one or more computer executable instructions and a set of predefined test codes to perform remote assessment of the target device;

wherein the set of predefined test codes include a set of instructions to automatically test one or more applications executing on the target device, and wherein the set of predefined test codes are executed for performing different types of assessments including a security testing, a regulation or compliance assessment, a functional testing, a fuzz testing, a regression testing, a safety testing, and a forensic analysis;

a processor coupled to the data repository to execute the one or more computer executable instructions; and an assessment device having:

a management engine, which when executed by the processor, implements a user interface between a client application (CA) installed on a user device and the assessment device, an interface module, which when executed by the processor, implements an interface to establish a communication between the proximity system and the target device over a communication network, wherein the interface module establishes the communication between the proximity system and an external interface of the target device over a wireless communication medium in a non-physical proximity mode and over a physical communication medium in a physical proximity mode, the interface module executing test case logic of the set of predefined test codes that is specific to the external interface of the target device and gathering test results therefrom; and an assessment engine (AE), which when executed by the processor, receives assessment instructions from the client application (CA) over the communication network, retrieves the set of predefined test codes from the data repository based on the assessment instructions, executes the set of predefined test codes for generating a communication data, the communication data comprising signals, protocol data, or both, for transmission the external interface of the target device, over a defined protocol or as raw signals, transmits the communication data to the target device communicatively coupled to the proximity system through a communication channel by way of an interface module, receives, by way of the interface module, a response from the target device produced by the target device responsive to the communication data transmitted to the device interface thereof, and interprets the response received from the target device to assess whether execution of the set of predefined test codes failed or succeeded and generates a test output indicative of whether execution of the set of predefined test codes failed or succeeded; and a management proxy (MP) that is a cloud based proxy for enabling remote access and usage of the proximity system when the management engine is not accessible by the client application (CA) over the communication network.

* * * * *